(No Model.) 2 Sheets—Sheet 1.
W. P. BETTENDORF.
MACHINE FOR RIVETING WHEEL TIRES.
No. 512,356. Patented Jan. 9, 1894.
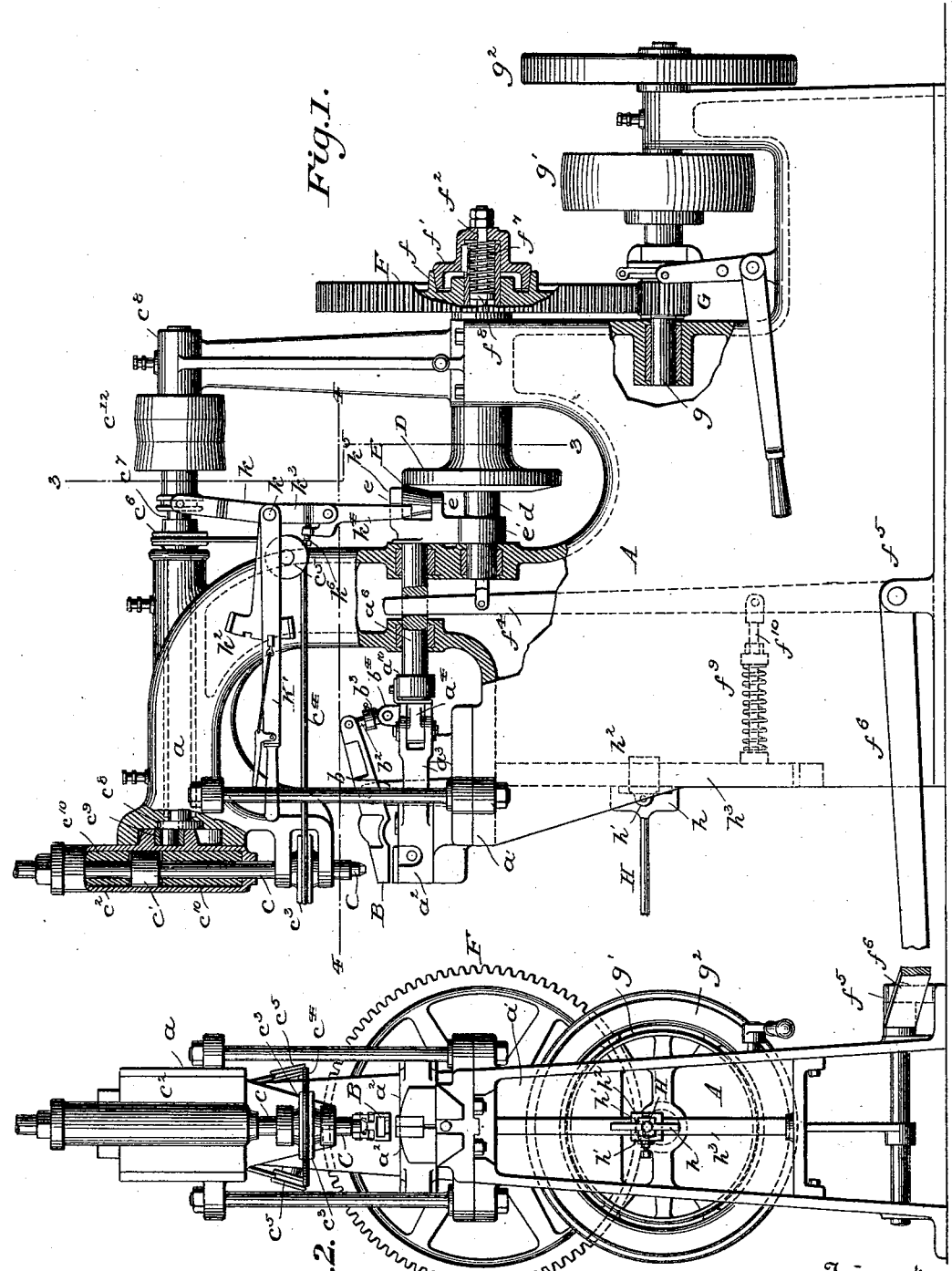
Witnesses
Raymond H. Barnes
Fabius S. Elmore
Inventor
W. P. Bettendorf
By P. T. Dodge
Attorney
THE NATIONAL LITHOGRAPHING COMPANY,
WASHINGTON, D. C.

(No Model.) 2 Sheets—Sheet 2.
W. P. BETTENDORF.
MACHINE FOR RIVETING WHEEL TIRES.

No. 512,356. Patented Jan. 9, 1894.

on line 4—4.

on line 3—3.

Witnesses
Raymond F. Barnes.
Fabius S. Elmore

Inventor
W. P. Bettendorf
By P. T. Dodge
Attorney

THE NATIONAL LITHOGRAPHING COMPANY,
WASHINGTON, D. C.

UNITED STATES PATENT OFFICE.

WILLIAM P. BETTENDORF, OF DAVENPORT, IOWA.

MACHINE FOR RIVETING WHEEL-TIRES.

SPECIFICATION forming part of Letters Patent No. 512,356, dated January 9, 1894.

Application filed March 23, 1893. Serial No. 467,278. (No model.)

*To all whom it may concern:*

Be it known that I, WILLIAM P. BETTENDORF, of Davenport, county of Scott, and State of Iowa, have invented a new and useful Improvement in Machines for Riveting Wheel-Tires, of which the following is a specification.

There are known in the art, metallic wheels in which each of the spokes is provided on the inner side of the tire with a shoulder and has its outer end headed or upset by means of which the tire is secured rigidly to the spokes.

The present invention relates to a power driven machine for upsetting or heading the outer end of the spokes, and embodies a clamping device adapted to hold the spokes and the tire in position, and a heading device adapted to act on the end of the spoke to upset the same upon the tire.

Figure 4:
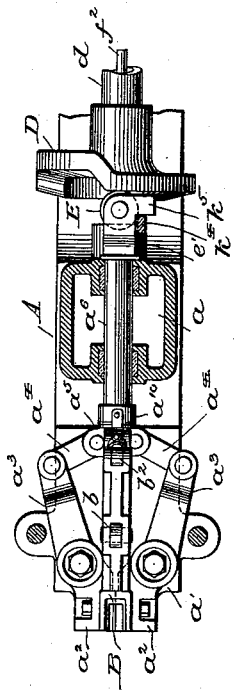
Figure 5:
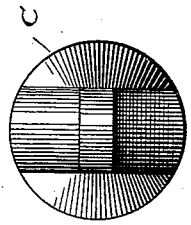
Figure 3:
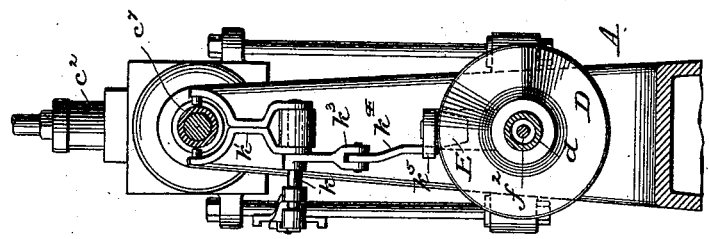

Referring to the accompanying drawings,—Figure 1 is a side elevation partly in section of my improved machine. Fig. 2 is a front elevation of the same. Fig. 3 is a vertical section on the line 3—3 of Fig. 1 looking in the direction indicated by the arrow. Fig. 4 is a horizontal section on the line 4—4 of Fig. 1, looking downward. Fig. 5 is a bottom plan view of the heading tool.

In the drawings,—A, represents the main frame or casting provided with the upwardly extending overhanging arm $a$, which sustains the header, and with a forwardly projecting portion $a'$ in which the clamping device is mounted. The clamping device consists of two horizontally moving jaws $a^2$, which are pivoted on the bed of the machine and provided with rearwardly extending arms $a^3$, recessed horizontally in their ends and connected by toggle links $a^4$ to a head $a^5$, provided with a swiveled nut $a^{10}$ which receives the screw threaded forward end of a longitudinally movable shaft $a^6$, the said shaft being mounted to slide in bearings in the upwardly extending arm $a$, before alluded to, the arrangement being such that as the shaft $a^6$ is moved forward the toggle links $a^4$ will be caused to move the ends of the arms $a^3$ outward and close the forward ends of the jaws on the spoke. The revolving nut $a^{10}$ forms in effect a turn-buckle, and by turning it in one direction or the other an adjustment is effected between the head and shaft whereby the jaws are closed to a greater or less extent according to the size of the spoke to be clamped. In connection with this clamping device for the spokes, I employ a pressure finger B, which is adapted to engage the upper side of the rim, and to hold the same securely in place upon the spoke during the operation of the header hereinafter described. This clamping finger consists of a lever pivoted to a standard $b$, extending upward between the arms of the clamping jaws, and has its rear end pivoted to a link $b^2$, which in turn is pivoted between ears $b^4$ extending upward from the head $a^5$, the construction being such that as the head is moved forward to close the jaws, the rear end of the lever will be elevated and its forward end lowered and held tightly upon the rim of the wheel. The forward end of this clamping finger is forked that the heading tool may operate on the end of the spoke which, when the wheel is in position, will be exposed between the forked ends of the finger. The link $b^2$ is made in two parts connected by a swiveled nut $b^3$ which, when turned in one direction or the other, lengthens or shortens the link, whereby an adjustment is effected to close the pressure finger more or less, according to the thickness of the rim to be clamped.

It will be noted that, by employing the revolving nuts on the forward end of the longitudinally movable shaft, and on the link connecting the head $a^5$ with the lever $b$, the parts are made adjustable, and their movement may be thus varied to adapt them to be employed in connection with wheels of varying dimensions.

The heading device consists of a horizontally rotating and vertically reciprocating tool C, which is mounted as before stated in the overhanging arm $a$, so that its lower end will be vertically above the forward end of the pressure finger beneath which the tire is clamped. This tool, as shown in Fig. 5, has its active end recessed at opposite sides, and presents an active face converging toward the center where it is slightly concave; the result of this peculiar form being that when the tool is rotated at a high speed, and rapidly reciprocated vertically, the end of the spoke will be upset uniformly and a rounded and finished head produced. The tool is carried at the lower end of a rod $c$, which is provided with a piston $c'$ mounted to reciprocate within a cylinder $c^2$, which in turn is sustained to reciprocate vertically in the forward end of the arm $a$. Near its lower end the rod $c$, is provided with a driving pulley $c^3$, splined thereto, over which a band $c^4$ extends around guide pulleys $c^5$, $c^5$, secured to the opposite sides of the arm $a$, whence the band passes over a pulley $c^6$ fixed to the horizontal shaft $c^7$, mounted in bearings in the upper portion of the overhanging arm, the rear end of the shaft being mounted in bearings $c^8$, rising from the rear portion of the main frame. At its forward end the shaft $c^7$ is provided with a disk $c^{18}$ having a crank-pin $c^9$, mounted in a bearing on the rear side of the reciprocating cylinder $c^2$.

From the foregoing it will be seen that on the rotation of the shaft $c^7$, the rod carrying the heading tool will be caused to rotate on its vertical longitudinal axis, and the cylinder within which the piston $c'$ attached to the rod is mounted will be reciprocated vertically. In order that this vertical reciprocation of the cylinder may be transmitted to the heading tool in a yielding manner, in other words, in order that the heading tool may have imparted to it a reciprocating movement, and at the same time have the force of the blows cushioned, I interpose between the piston $c'$, and the two ends of the cylinder, yielding collars $c^{10}$. By the employment of these yielding collars it has been found in practice that as the cylinder was reciprocated the piston would be caused to partake of a like motion in a positive and forcible manner, but that the blows given by the tool were not productive of objectionable results where its connection to the driving motor was rigid as distinguished from a yielding connection as in the present instance.

Of course it is to be understood that the yielding or elastic collars may be replaced by springs or other equivalent devices, the essence of the invention in this regard residing in the employment of a yielding medium between the tool and the device for reciprocating the same.

The horizontal shaft $c^7$ is driven by a pulley $c^{12}$ which is clutched thereto, a peculiar form of operating lever being provided for controlling the clutch which will be more fully described hereinafter.

In order that the shaft $a^6$ may at the proper time be automatically advanced to close the clamping jaws and finger on the wheel under operation, I provide the cam D, which is fixed to a hollow shaft $d$, mounted in bearings in the rear portion of the main frame as shown. This cam is arranged to be engaged by a roller E, mounted between horizontal ears $e$, projecting laterally from a head $e'$ fixed to the rear end of the shaft $a^6$, the lower end of the head being mounted to slide upon the shaft $d$. The cam is of such form that during a portion of its revolution the head $e'$ will be advanced, thereby causing the jaws to close, and during the remainder of the revolution of the cam the head will be permitted to recede, thereby opening the jaws. Motion is imparted to the cam by means of a gear wheel F, mounted loosely on the extended end of the hollow shaft $d$, and arranged to be frictionally connected to the shaft as more fully described hereinafter. The gear wheel F is in turn driven by a pinion G, fixed to a horizontal shaft $g$, mounted in bearings in the lower rear portion of the main frame, the shaft $g$, being provided with a driving pulley $g'$ clutched thereto and a balance wheel $g^2$.

The gear wheel F as before alluded to is provided with an annular ring $f$, having its interior surface ground and adapted to be frictionally engaged by a cap $f'$ splined to the extended end of the shaft $d$. This cap is connected to a horizontal rod $f^2$, which extends within the shaft $d$, and has its forward end pivoted near the upper end of a vertical lever $f^4$, which has its upper end extended through the shaft $a^6$. The lower end of this lever is pivoted to a standard $f^5$, and has rigidly fixed thereto a horizontally projecting foot piece $f^6$. A spiral spring $f^7$ encircles the rod $f^2$, and bears at its opposite ends against the cap and against a disk $f^8$ fixed within the hollow shaft $d$. This spring tends normally to move the cap rearward out of engagement with the annular ring on the pinion $f$. This clutch mechanism is thrown into action to cause the rotation of the shaft $d$, by pressure on the foot piece $f^6$. A spiral spring $f^9$ mounted on a horizontal rod $f^{10}$, and bearing at one end on the main frame, and at the opposite end on a collar fixed to said rod, tends normally to move the rod $f^{10}$ rearward and, owing to the connection of the latter with the vertical lever $f^4$, its effect will be to move said lever rearward and thereby retract the shaft $a^6$ to open the clamping jaws, and also to assist the spring $f^7$ in throwing the clutch out of action. The wheel is sustained during the operation of the machine by a horizontal rod H, which extends through the hub. This rod is connected to a plate $h$, which is pivoted between ears $h'$ extending from a block $h^2$ recessed to fit a vertical bar $h^3$ mounted in the forward portion of the main frame. This block slides on the bar, and may be adjusted to varying positions thereon by means of a clamping screw $h^4$.

The operation of the machine is as follows, it being understood that the upper and lower shafts are driven separately from any suitable power shaft or shafts by separate belts applied respectively to the pulleys $c^{12}$ and $g'$: The hub of the partially completed wheel is passed over the rod H, and the spoke to be riveted is placed between the clamping jaws with the rim beneath the clamping finger. Power being transmitted to the machine through the driving pulley $g'$, the foot lever is depressed, thereby advancing the shaft $a^6$, closing the clamping jaws and finger on the spokes and tire, and moving the cap $f'$ into frictional engagement with the gear wheel $f$. The cam D will thus be rotated and will act on account of its form to hold the head $e'$ fixed to shaft $a^6$, forward and maintain the jaws and clamping finger in a closed position. The forward movement of the shaft $a^6$ automatically operating to clutch the driving pulley $c^{12}$, to the upper horizontal shaft, the latter will be rotated, and the heading tool will be caused to reciprocate vertically and at the same time rotate on its vertical longitudinal axis,—the end of the spoke thereunder being acted on by the tool. In the meantime the cam D will have revolved so that on the completion of the operation the head $e'$ will be allowed to be retracted, which action is effected automatically by the spring $f^9$, and spring $f^2$, the latter serving to move the cap $f'$ out of engagement with the gear wheel $f$, and stop the rotation of the cam. The wheel may then be turned to bring another spoke into position or be removed, and replaced by another, when on depressing the foot lever the operation will be repeated. In order that the motion of the heading tool may be automatically arrested on the completion of the heading operation, and in order that it may be automatically started at the proper time, I provide a peculiar lever for operating the clutch on shaft $c^7$. This lever consists of an upper member $k$, which has its upper end forked in the usual manner to embrace the sliding part of the clutch, and has its lower end mounted on a horizontal pivot sustained in a bracket projecting rearwardly from the overhanging arm $a$.

$K'$, represents an operating lever provided with a locking dog and mounted on the horizontal pivot $k$; and connected rigidly to the upper member preferably by mounting both of these parts rigidly on the pivot $k$, making in effect an angular lever.

$k^2$ represents a notched segment plate adapted to be engaged by a locking dog on the operating lever and which is provided with an angular arm $k^3$, the said plate being seated loosely on the pivot $k$ between the operating lever and the upper member $k$. The end of the angular arm $k^3$ is provided with an open slot in which is pivoted a depending finger $k^4$, its lower end being arranged in the path of a laterally projecting lip $k^5$ extending from the upper ear of the head $e'$. The upper end of the finger $k^4$ is offset and threaded to receive a set-screw $k^6$, arranged to bear upon the angular arm of the segment plate, by means of which the lower end of the finger may be adjusted with relation to the head $e'$, and thus vary the point at which it will be engaged by the latter. From this it will be seen that when the locking dog is in engagement with the segment plate, the upper member of the lever, and the depending finger, are rigidly connected so that when the head $e'$ on the longitudinally movable shaft is advanced, the lip engaging the finger $k^4$, will move the operating lever and segment plate upward and the upper member of the clutch-operating lever $k$, rearward thereby clutching the driving pulley to the shaft $c^7$. On the retraction of the head the weight of the operating lever and segment plate will move the upper member $k$, forward and automatically unclutch the pulley $c^{12}$. It will further be seen that while the head is in an advanced position, and the jaws and clamping finger closed on the wheel, should it become necessary to arrest the motion of the heading tool without opening the clamping jaws, it can be accomplished by disengaging the locking dog from the segment plate and depressing the lever $k'$, which, owing to its rigid connection with the upper member, will move the same forward and unclutch the pulley.

Having thus described my invention, what I claim is—

1. In a machine of the character described the combination of the clamping jaws, the reciprocating shaft coupled therewith, the driven shaft $d$, the cam thereon for actuating the reciprocating shaft and jaws, and the clutch mechanism on the driven shaft connected with said reciprocating shaft.

2. In a machine of the character described the combination of the reciprocating header, the rotary shaft for actuating the same, the driving pulley and clutch thereon, the clamping jaws, the reciprocating shaft coupled therewith to actuate the same, the rotary cam for operating the reciprocating shaft and jaws, and intermediate connections through which the said cam operates the clutch on the header-driving shaft.

3. In a machine of the character described the combination of the header, the rotary shaft for actuating the same, the pulley and clutch thereon, the clamping jaws, the reciprocating shaft coupled therewith, the rotary shaft $d$, the cam thereon for actuating the said reciprocating shaft to close the jaws, the driving gear and clutch on the shaft $d$ and connections between the reciprocating shaft, the clutch on the header driving shaft, and the clutch on the shaft $d$, whereby the jaws and both of said clutches are operated simultaneously by the cam.

4. In a machine of the character described the combination of a heading mechanism, a clamping and holding mechanism including a rotary cam, driving gear and clutches for operating said mechanisms independently of each other, means for manually throwing the clutch of the clamping mechanism into action, and connections between the clamping mechanism and the clutch of the heading mechanism for throwing said clutch into action when the clamping mechanism is started.

5. In a machine of the type described, the combination of the clamping jaws and the pressure finger, the head connected to said parts, the longitudinally movable shaft mounted in bearings in the frame and carrying said head, the head E' on the end of said shaft and the cam adapted to engage said head E' and advance the same.

6. In a machine of the type described, the combination of the clamping device, the longitudinally movable shaft to operate the same, the head on the rear end of the shaft, the shaft $d$, the cam thereon, a gear wheel loosely mounted on said shaft, the clutch connected to the shaft, the clutch-operating lever and suitable connections between said lever and the longitudinally movable shaft.

7. In a machine of the type described, the combination of the clamping device, the longitudinally movable shaft for operating the same, the head $e'$ on the rear end of said shaft, the shaft $d$ mounted in bearings in the frame and extending through the opening in the head, the cam fixed to said shaft and engaging the head, the gear wheel mounted loosely on the shaft $d$, the clutch keyed to said shaft, the bar connected to said clutch and extending through the shaft, the lever $F^4$ pivoted to said bar and engaging the shaft $a^6$, and the means for throwing the clutch out of engagement.

8. In a machine of the type described, the combination of the heading device, driving mechanism therefor, the clutch controlling the same, the hand lever for operating the clutch and provided with a locking dog, the segment plate adapted to be engaged by the locking dog and provided with the depending rigid finger, the clamping device, the longitudinally movable shaft for closing the same, the head carried on the rear end of the shaft, and means for advancing the head, said head constructed to engage the depending finger; whereby when the head is advanced to close the clamping device the clutch will be automatically actuated and maintained in operative position but may be independently operated by the hand lever.

9. In a machine of the type described, the combination of the main frame, the vertically reciprocating rotatable heading tool, the horizontal shaft to drive the same, the driving pulley mounted loosely on said shaft, the clutch for the same, the horizontally moving clamping jaws adapted to engage the spoke, the pivoted pressure finger in position to engage the tire, the longitudinally movable shaft connected to the jaws and pressure finger and adapted to close the same, the head on the rear end of the shaft, the cam adapted to engage the head and advance the same, the lever connected to the clutch and having its end arranged in the path of the head $f^4$, the lever connected to the shaft and arranged to actuate the same independently of the cam, and the spring acting to retract the shaft and open the clamp.

In testimony whereof I hereunto set my hand, this 11th day of November, 1892, in the presence of two attesting witnesses.

WM. P. BETTENDORF.

Witnesses:
W. H. DECKER,
NATHL. FRENCH.